June 24, 1924.

R. F. RUNGE

CLOSURE AND METHOD OF APPLYING THE SAME

Filed July 11, 1923

1,498,674

Inventor
Robert F. Runge
By his Attorneys
Rogers, Kennedy Campbell

Patented June 24, 1924.

1,498,674

UNITED STATES PATENT OFFICE.

ROBERT F. RUNGE, OF FOREST HILLS, NEW YORK, ASSIGNOR TO THE SKAYEF BALL BEARING COMPANY, A CORPORATION OF CONNECTICUT.

CLOSURE AND METHOD OF APPLYING THE SAME.

Application filed July 11, 1923. Serial No. 650,878.

*To all whom it may concern:*

Be it known that I, ROBERT F. RUNGE, a citizen of the United States, residing at Forest Hills, in the county of Queens and State of New York, have invented certain new and useful Improvements in Closures and Methods of Applying the Same, of which the following is a specification, reference being had therein to the accompanying drawing.

The object of this invention is to provide a secure closure for a housing in which there is located a part rotating relatively to the housing, and in many instances in which a portion of the rotary part extends through the center of the closure. This improved closure holds the parts together as a self-contained handling unit and serves to keep the grease or other lubricant within the housing preventing its escape and guarding the parts housed from the entrance of foreign matter.

In the drawings accompanying this application—

Figure 1:
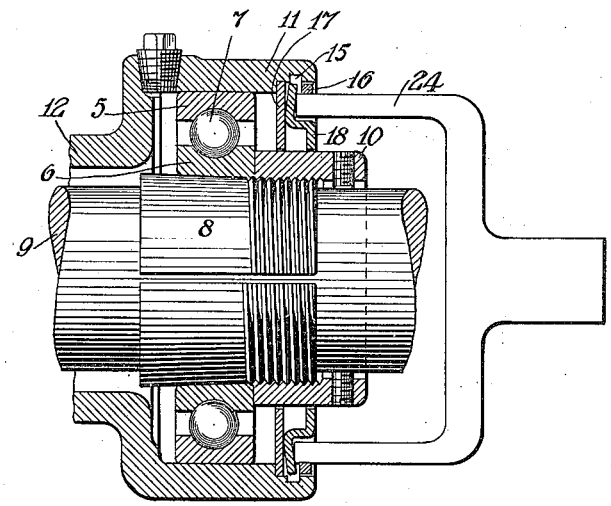
Figure 1 shows the mode of applying the closure parts to a housing, the housing and some of its enclosed parts being shown in section and others in elevation.

As the invention is particularly adapted for use in closing the housings for antifriction bearings, especially those having rolling elements, there is illustrated herein in connection with the housing, 4, a ball bearing having outer and inner rings, 5 and 6, between which there is mounted a row of balls, 7. The inner ring, 6, is shown mounted upon an adapter sleeve, 8, of a well known construction which is represented as clamped upon the shaft, 9, as for instance a lineshaft, by means of a nut of some suitable description as for instance the nut 10. The ball bearing is enclosed within the chamber of the housing portion, 11, of a broken away structure, 12, which will be assumed to be a lineshaft hanger box.

It will be seen from the drawings that the nut, 10, has a cylindrical outside diameter which extends outwardly beyond the housing, 11, in the illustrated form. The mode of mounting the bearing selected for this illustration is that wherein the inner ring has a tight fit upon the shaft and the outer ring has a tight but creeping fit in the housing, the bore of the housing being cylindrical for accommodating the cylindrical outer diameter of the ball bearing outer ring.

Figure 3:
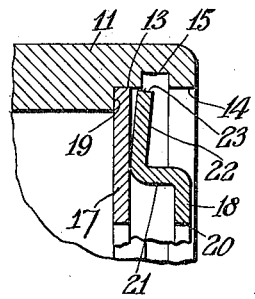
Fig. 3 is an enlarged detail.

By reference to the drawing and particularly Figure 3, it will be seen that the bore of the housing, 11, is enlarged at its outer edge as at 13 and 14, and that the face formed by this enlargement has at its center portion a groove, 15, for receiving the locking ring, 16, presently to be described.

The closure presenting in the illustration an oil groove, consists of two sheet metal plates, 17 and 18. As the selected illustrative example of the invention is a mounting in which the shaft extends through the closure, these plates are shown having a large central perforation for the accommodation of the shaft or a part carried thereby, as for instance, the clamping nut, 10. The plate, 17, is illustrated in the form of a flat ring adapted to lie in the inner corner of the recess, 13, and abut against the shoulder, 19, formed by such recess. The closure member, 18, in cross section is somewhat Z-shaped. The inner part, 20, and that which is shown lying adjacent the extending rotary member is substantially flat, that is, in its initial and unassembled position it occupies a plane substantially radial to the housing and the shaft. Outwardly of the portion, 20, there is a portion, 21, bent substantially at right angles, and outwardly of the portion, 21, is a portion, 22, which when the device is assembled closely engages the member, 17, and occupies a plane substantially radially of the shaft and parallel to the plane of the portion, 20. In its initial position, however, it is at an angle to such plane, its outer edge, 23, being slightly offset from the radial plane. When the entire member, 18, is considered before assembly, the part 20 is a flat ring and the part 22 is a conical ring. The recess, 13, in practice is preferably slightly narrower longitudinally of the housing than the combined widths of the member 17, and the portion 22 of the member 18.

Figure 2:
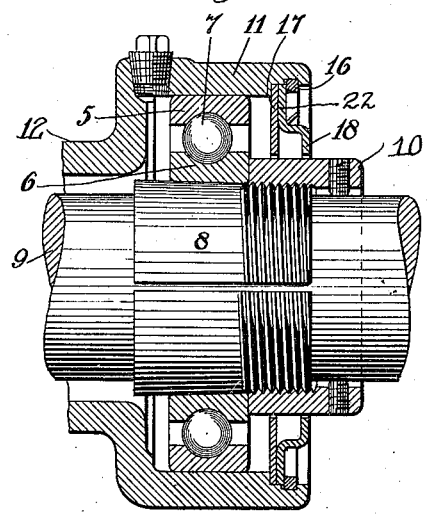
Fig. 2 is a view somewhat similar to Figure 1 showing the labyrinth or closure assembled.

When it is desired to assemble the closure it may be done either before or after the housing and the contained parts are placed upon the shaft, as occasion may demand. The plate 17 is dropped into position in the recess 13 against the shoulder 19. A spring ring of square wire which is of sufficient dimensions to freely fit within the recess 15 and extend from such recess inwardly of the housing below the base of the recess 13, is provided, and after the member 18 is located in position, substantially as shown in Figure 1, this spring ring, 16, is placed in the recess 14, and a setting tool, as for instance a spider with a plurality of feet, 24, brought to bear upon the portion 22 of the member 18, and this is sprung into surface engagement with the member 17, and sufficient past the recess 15 to permit the spring ring, 16, to snap into position, and the parts assume a position substantially as illustrated in Figure 2, whereupon the closure is securely fastened in the housing and in such a way that it may be removed when occasion demands by merely prying out the split ring, 16, in a well known manner.

It is to be understood that changes in detail may be made within the scope of the claims without departing from the spirit of my invention.

I claim as my invention:

1. A body having an open chamber, the walls of the opening being formed with a recess presenting an outwardly facing shoulder, outwardly of such shoulder there being a groove formed in the wall of the recess presenting an inwardly facing shoulder, in combination with a pair of closure plates disposed in such recess, the plates being so formed as to tend to spring apart at their outer edges, and a ring formed of rectangular wire occupying the groove and engaging the inwardly facing shoulder and overhanging the plates for holding the edges of these together and against the said outwardly facing shoulder.

2. A body having an open chamber, the walls of the opening being formed with a recess presenting an outwardly facing shoulder, outwardly of such shoulder there being a groove formed in the wall of the recess presenting an inwardly facing shoulder, in combination with a pair of closure plates disposed in such recess, one of the plates being substantially flat and the other being offset, whereby the plates tend to spring apart at their outer edges, and a ring formed of rectangular wire occupying the groove and engaging the inwardly facing shoulder and overhanging the plates for holding the edges of these together and against the said outwardly facing shoulder.

3. A body having an open chamber, the walls of the opening being formed with a recess presenting an outwardly facing shoulder, outwardly of such shoulder there being a groove formed in the wall of the recess presenting an inwardly facing shoulder, in combination with a pair of closure plates disposed in such recess, the plates being so formed as to tend to spring apart at their outer edges, and having centrally disposed openings and being spaced apart at and adjacent such opening, and a ring formed of rectangular wire occupying the groove and engaging the inwardly facing shoulder and overhanging the plates for holding the edges of these together and against the said outwardly facing shoulder.

4. A body having an open chamber, the walls of the opening being formed with a recess presenting an outwardly facing shoulder, outwardly of such shoulder there being a groove formed in the wall of the recess presenting an inwardly facing shoulder, in combination with a pair of closure plates disposed in such recess, one of the plates being substantially flat and the other being offset, whereby the plates tend to spring apart at their outer edges, and having centrally disposed openings and being spaced apart at and adjacent such opening, and a ring formed of rectangular wire occupying the groove and engaging the inwardly facing shoulder and overhanging the plates for holding the edges of these together and against the said outwardly facing shoulder.

5. The mode of assembling closures in a recess formed at the opening of a chamber which consists in squeezing together and against the bottom of the recess a pair of plates normally tending to spring apart at their outer edges and then dropping a wire ring, rectangular in cross section, upon the plates while held in compression and permitting the ring to expand into a suitably formed groove whereby it in part occupies the groove and in part overhangs the plates for holding the edges of these together.

In testimony whereof, I have affixed my signature hereto.

ROBERT F. RUNGE.